(12) United States Patent
Mestha

(10) Patent No.: US 6,449,045 B1
(45) Date of Patent: Sep. 10, 2002

(54) SYSTEM AND METHOD FROM RECONSTRUCTION OF SPECTRAL CURVES USING MEASUREMENTS FOR A COLOR SENSOR AND STATISTICAL TECHNIQUES

(75) Inventor: Lingappa K. Mestha, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/562,072

(22) Filed: May 1, 2000

(51) Int. Cl.[7] .................................................. G01J 3/46
(52) U.S. Cl. ....................... 356/402; 356/420; 356/421
(58) Field of Search ........................... 356/402, 73, 411, 356/420, 421

(56) References Cited

U.S. PATENT DOCUMENTS

| | | | |
|---|---|---|---|
| 5,107,332 A | | 4/1992 | Chan |
| 5,537,516 A | | 7/1996 | Sherman et al. |
| 5,668,596 A | * | 9/1997 | Vogel .......................... 348/222 |
| 5,671,059 A | | 9/1997 | Vincent |
| 5,767,980 A | * | 6/1998 | Wang et al. ................ 358/298 |
| 5,805,314 A | * | 9/1998 | Abe et al. ................... 358/518 |
| 5,963,244 A | | 10/1999 | Mestha et al. |
| 6,272,440 B1 | * | 8/2001 | Shakespeare et al. ......... 356/73 |

OTHER PUBLICATIONS

Gretag Imaging http://www.gretagimagingin.ch/main.asp.
X-rite www.xrite.com/ pp. 1–3.
Jasskelainen et al. "Vector–subspace model for color representation" "Optical Society of America" vol. 7. No. 4/Apr. 1990.

* cited by examiner

Primary Examiner—Frank G. Font
Assistant Examiner—Roy M. Punnoose
(74) Attorney, Agent, or Firm—Oliff & Berridge, PLC

(57) ABSTRACT

A limited number of voltage measurements are received from a multiple illuminant color sensor at the direction of a color sensor controller. The received sensor voltages are normalized in accordance with a calibration look-up table. Next, the normalized sensor voltages are converted to reflectance values based on a correction look-up table. Then, a reconstruction look-up table is used to convert the reflectance values at a predetermined wavelength to reflectance values with a predetermined wavelength separation.

25 Claims, 6 Drawing Sheets

SYSTEM AND METHOD FROM RECONSTRUCTION OF SPECTRAL CURVES USING MEASUREMENTS FOR A COLOR SENSOR AND STATISTICAL TECHNIQUES

BACKGROUND OF THE INVENTION

1. Field of Invention

This invention is related to image processing systems. In particular, this invention is directed toward a system and method that determines a spectral curve from a color sensor.

2. Description of Related Art

A typical spectrophotometer measures the reflectance of an illuminated object of interest over a plurality of light wavelengths. Typical prior spectrophotometers in this context used 16 or higher channels measuring from approximately 400 nm to 700 nm, to cover the visible color spectrum or wavelength range. A typical spectrophotometer gives color information in terms of measured reflectances or transmittances of light, at the different wavelengths of light, from the test surface. This measures more closely estimates what the human eye would see as a combined image of a broad white light spectra image reflectance. This spectrophotometer desirably provides distinct electric signals corresponding to the different levels of reflected light received from the respective different illumination wavelength ranges or channels.

SUMMARY OF THE INVENTION

However, it is not efficient to install a reference spectrophotometer in every image processing system. As an alternative, a multiple light emitting diode (LED) reflectance spectrophotometer, such as that described in copending U.S. Ser. No. 09/535,007, incorporated herein by reference in its entirety, illuminates a target with a narrow band or monochromatic light. For a low cost implementation of the color sensor based on a multiple illuminant device as the illumination source, generally, for example, 10, 12 or 16 LEDs are selected. Each LED is selected to have a narrow band response curve in the spectral space. Therefore, for example, ten LEDs would correspond to ten measurements in the reflectance curve, when the measurements are obtained by measuring each LED independently. The LEDs, or other multiple illuminant based color sensor equivalent, e.g., lasers, are switched on one at a time as, for example, the measured media is passed through a transport of a printer. The reflected light is then detected by a photodetector and the corresponding voltage integrated. The integrated voltage is a function of the surface reflectance of the sample. These voltages are then normalized with, for example, a white tile. The normalized voltages are then converted to reflectance values to generate a fully populated reflectance spectra which conforms to standards set by, for example, the industry recognized reference spectrophotometer produced by Gretag Industries, hereinafter "the Gretag device" or comparable devices produced by the X-Rite corporation.

One way to achieve a full spectrum of measurements is to increase the number of illumination devices on the color sensor device. However, the addition of each additional illumination device increases the cost of the sensor and, since the measurements are taken serially, reduces the speed at which test measurements can be taken.

Therefore, the system and method of this invention use an algorithmic approach to convert a number of multiple illuminant sensor voltages to reflectance values independently of the response curve of the illuminant devices. For an alternative approach to determining a spectral curve see copending U.S. application No. 09/621,860, filed herewith, and incorporated herein by reference in its entirety.

In particular, a limited number of voltage measurements are received from, for example, a LED color sensor at the direction of a color sensor controller. The received sensor voltages are normalized in accordance with a calibration look-up table. The calibration look-up table contains the white tile measurements which are a standard practice and are well known in the color measurement industry. Next, the normalized sensor voltages are converted to reflectance values based on a correction look-up table obtained at mean LED wavelengths. Then, a reconstruction look-up table is used to convert the reflectance values at a mean wavelength to reflectance values with a predetermined wavelength separation to produce a full spectra reflectance curve output.

This invention provides a system and method that determine a full spectral reflectance curve.

This invention separately provides a system and method that determine a spectral curve using measurements from a switched multiple illuminant color sensor.

This invention separately provides a system and method that determine a spectral curve using measurements from a switched multiple LED color sensor.

This invention additionally provides a system and method in which reconstruction techniques are used to build transformation look-up tables.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

The process used to develop a full spectral reflectance curve from a limited number of initial reflectance values is determined as follows.

A reconstruction technique uses the knowledge of color space to convert a limited number of measurements from a low cost, and non-fully populated multiple illuminant, e.g., LED-based, color sensor into a fully populated spectral curve that is comparable to the output from a reference spectrophotometer. The differentiation capabilities of the system and methods of this invention with respect to existing and widely known and implemented interpolation methods is that a reasonably accurate extrapolation can be achieved in regions where spectral measurements are not possible due to, for example, cost constraints and limitations in the number of illuminant devices, such as LEDs or lasers, in the color sensor. Thus, the system and method of this invention can convert measurements from a non-fully illuminant populated color sensor into spectrophotometer-like measurements instead of mere colorimeter-like measurements. By using the reconstruction techniques of this invention, which are based on a reference spectrophotometer, a transformation look-up table is determined. Therefore, to implement the system and method of this invention, a pre-determined look-up table, that is, for example, stored inside the color sensor hardware or inside a control computer, is referenced.

By way of background, FIGS. 1–4 illustrate a graph of the reflectance spectra of four different Pantone™ samples. Superimposed on the Gretag device's, or reference, output are the corresponding measurements obtained from an exemplary LED color sensor. The data points represented by the symbol "o" represent the normalized voltages obtained from the LED color sensor using white tile calibration data and the data points represented by the symbol "+" represent the corrected normalized voltages. By passing the normalized voltages through a statistical model, the differences between the reference reflectance values and the normalized voltages are reduced. Therefore, these corrected reflectance values can be used to reconstruct the spectra. In particular, reconstruction is required to determine the full spectral reflectance curve in order to comply with Gretag standards.

For example, to obtain a smooth curve between the LED color sensor measurements, similar to that of the Gretag device, a linear or cubic spline algorithm that interpolates the data points without knowledge of the color space could be used. However, due to a lack of measurements at wavelengths below 430 nm and above 660 nm, due to lack of LEDs at these wavelengths in the LED color sensor, extrapolation can lead to errors.

Figure 1:
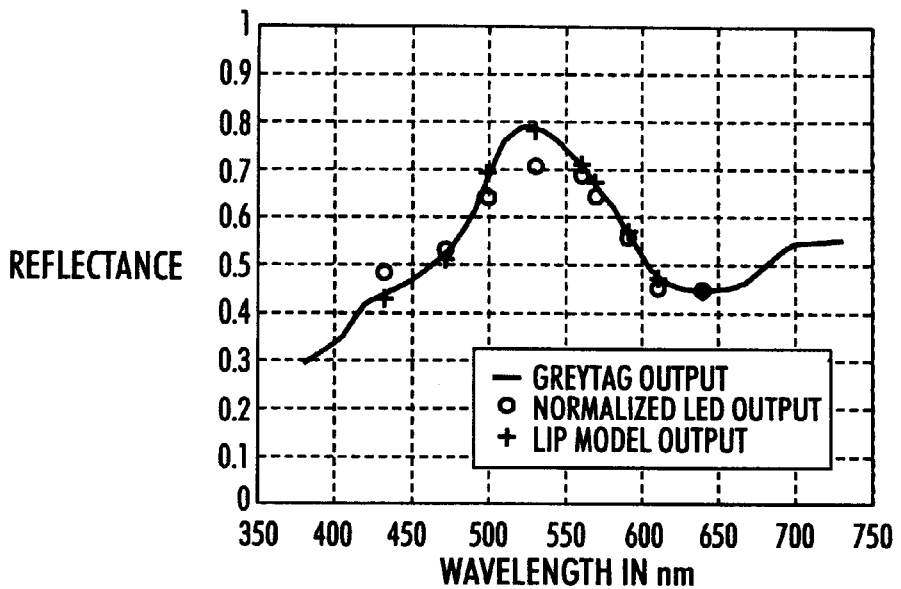
FIG. 1 is a graph illustrating an exemplary normalized sensor output, a reference output and a corrected normalized sensor output for a first exemplary Pantone™ sample.
Figure 2:
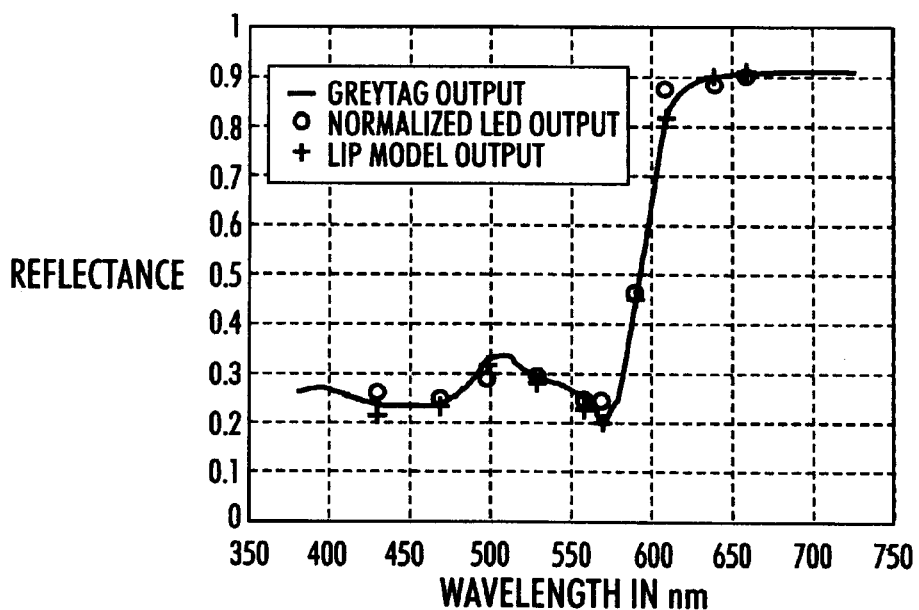
FIG. 2 is a graph illustrating an exemplary normalized sensor output, a reference output and a corrected normalized sensor output for a second exemplary Pantone™ sample.
Figure 3:
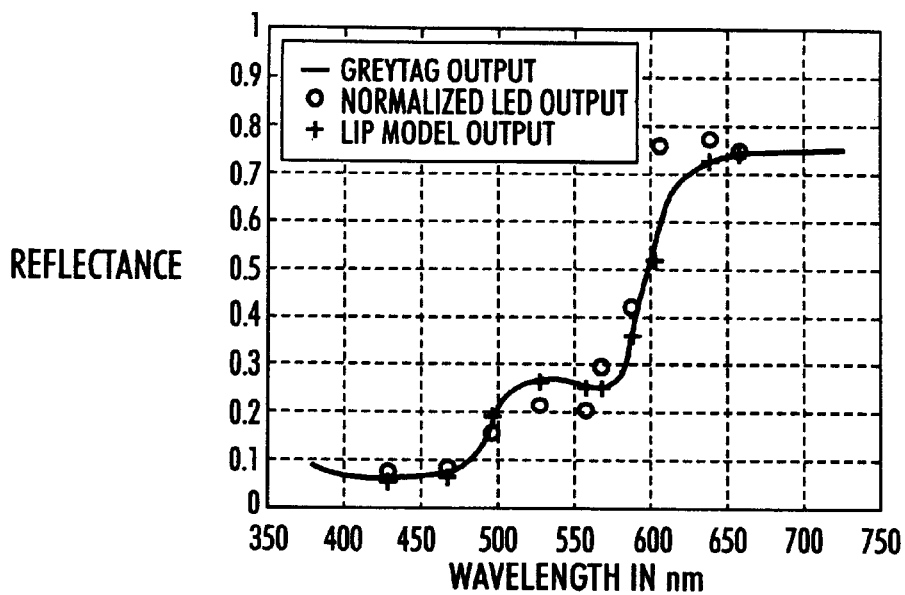
FIG. 3 is a graph illustrating an exemplary normalized sensor output, a reference output and a corrected normalized sensor output for a third exemplary Pantone™ sample.
Figure 4:
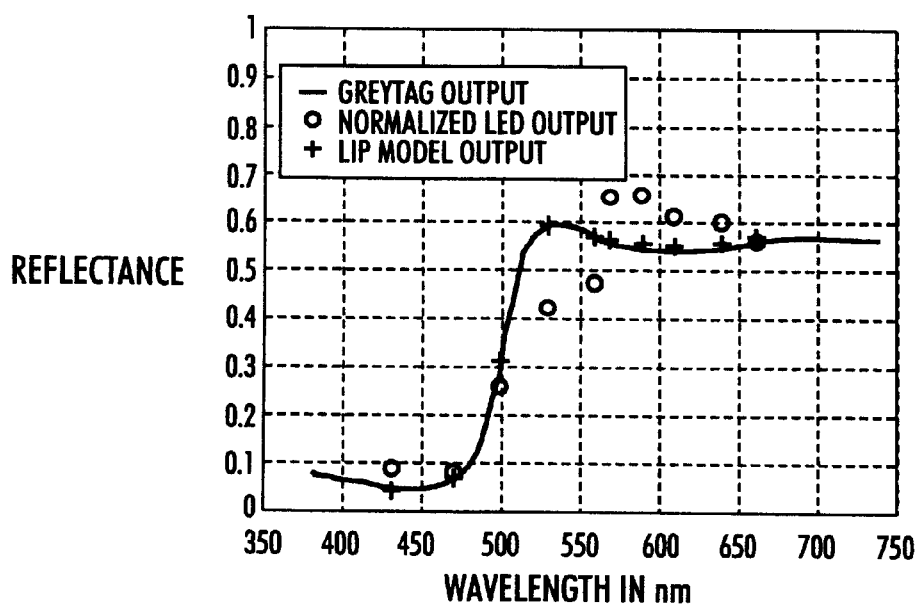
FIG. 4 is a graph illustrating an exemplary normalized sensor output, a reference output and a corrected normalized sensor output for a fourth exemplary Pantone™ sample.
Figure 5:
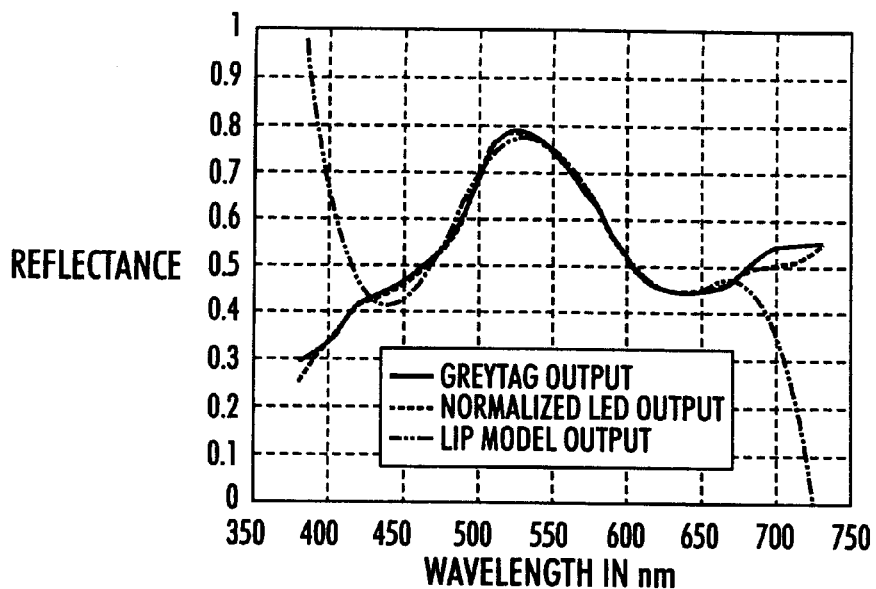
FIG. 5 is a graph illustrating a comparison between the reconstructed spectra, the interpolated spectra, and the reference measurement for the first Pantone™ sample.
Figure 6:
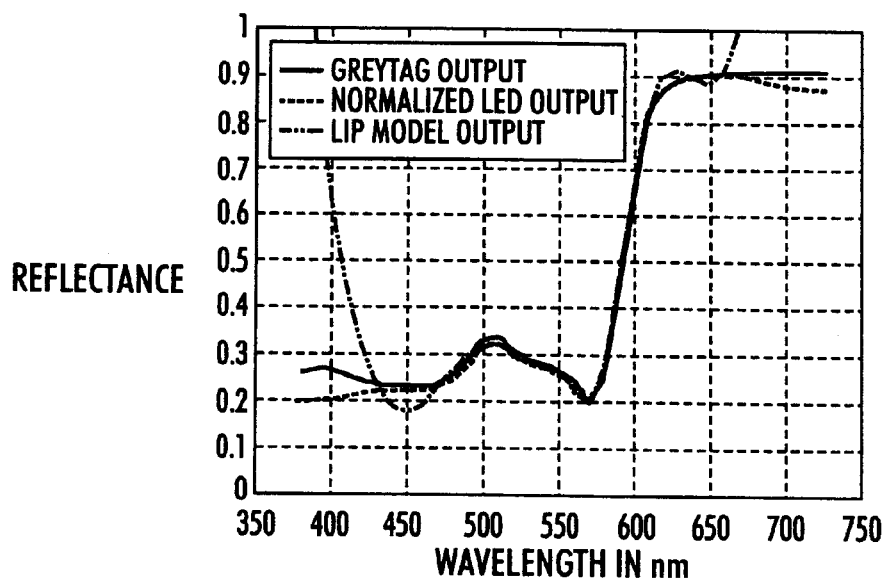
FIG. 6 is a graph illustrating a comparison between the reconstructed spectra, the interpolated spectra, and the reference measurement for the second Pantone™ sample.
Figure 7:
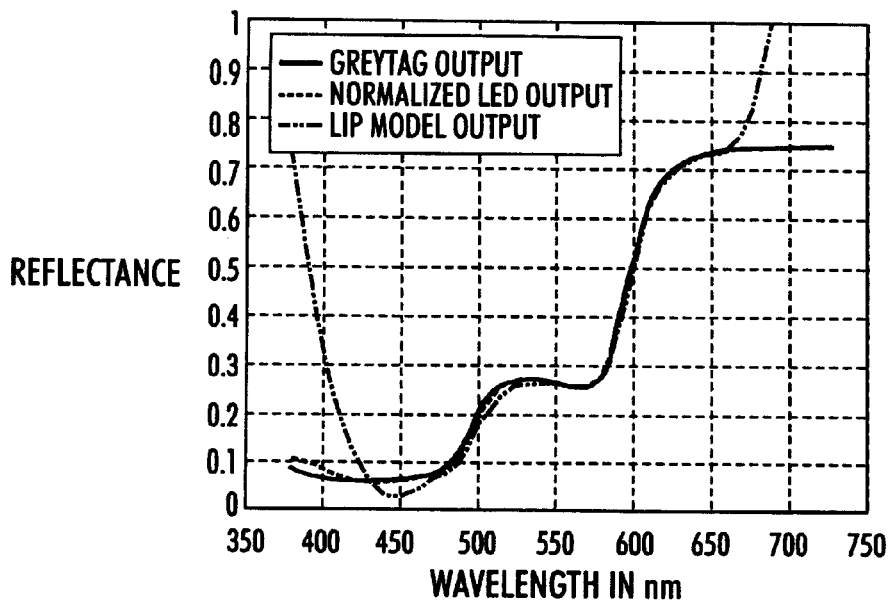
FIG. 7 is a graph illustrating a comparison between the reconstructed spectra, the interpolated spectra, and the reference measurement for the third Pantone™ sample.
Figure 8:
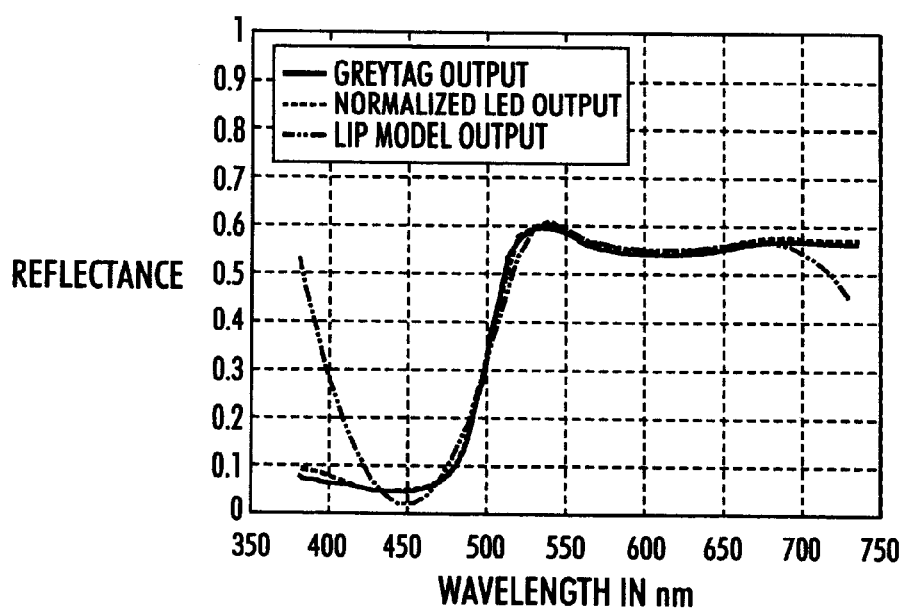
FIG. 8 is a graph illustrating a comparison between the reconstructed spectra, the interpolated spectra, and the reference measurement for the fourth Pantone™ sample.

FIGS. 5–8 illustrate the relationship between a reference reflectance as measured by a reference device, such as the Gretag device, an interpolated curve based on a spline function, and the reconstructed curve based on an optimal reconstruction look-up table according to this invention. As illustrated by FIGS. 5–8, extrapolation accuracy is improved when determined with the reconstruction algorithm as compared to the spline or any other known interpolation method. In particular, FIG. 5 illustrates that the ΔE, i.e., the difference between the reference, e.g., illustrated as the "Gretag output," and the reconstructed spectra for the first exemplary Pantone™ sample is 0.61. FIG. 6 illustrates that the ΔE between the reference and reconstructed spectra for the second exemplary Pantone™ sample is 1.24. FIG. 7 illustrates that the ΔE between the reference and reconstructed spectra for the third exemplary Pantone™ sample is 0.44. FIG. 8 illustrates that the ΔE between the reference and reconstructed spectra for the fourth exemplary Pantone™ sample is 0.72.

Figure 9:
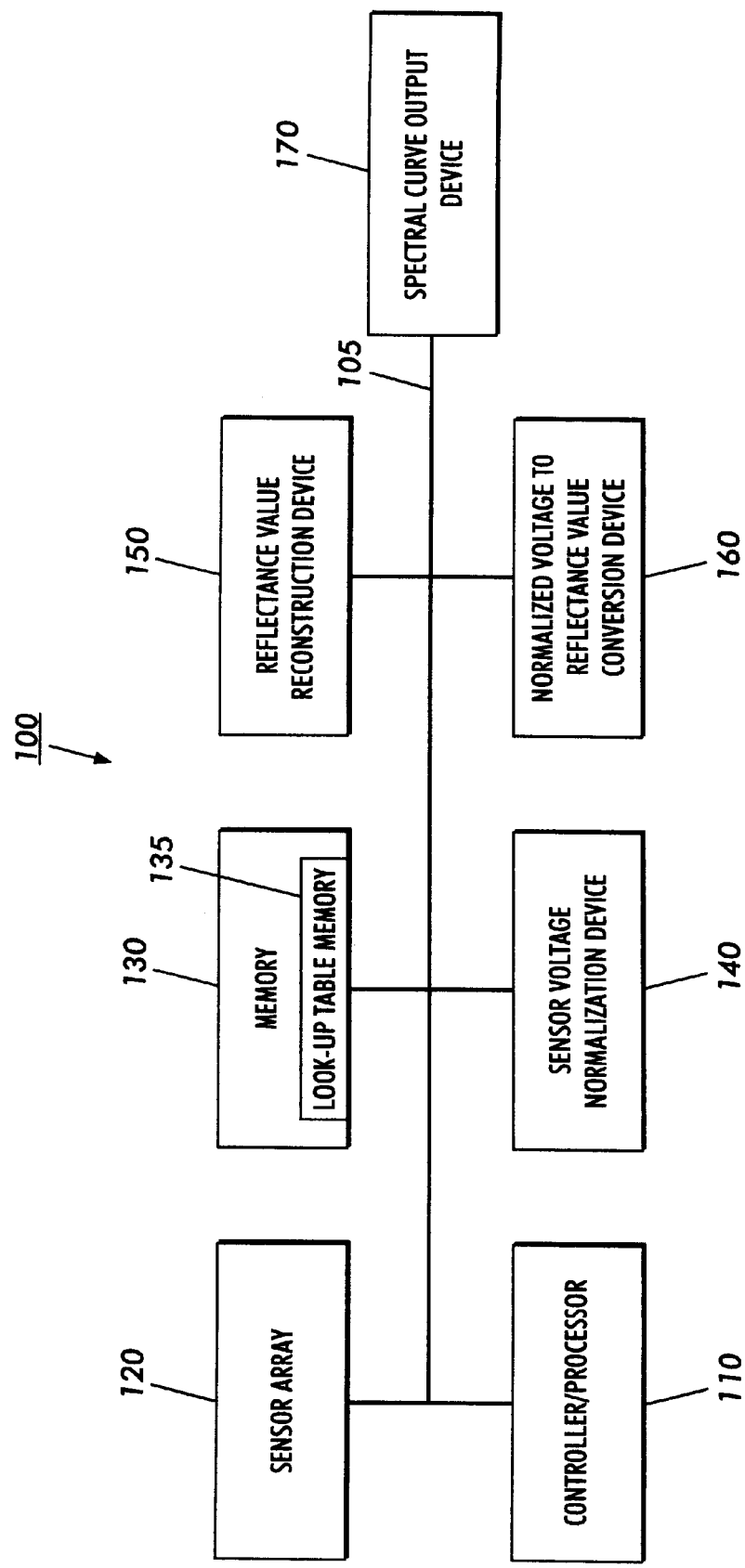
FIG. 9 is a functional block diagram illustrating an exemplary embodiment of the spectral curve reconstruction device according to this invention.

FIG. 9 illustrates an exemplary spectral curve reconstruction device 100 according to this invention. The spectral curve reconstruction device 100 comprises a controller/processor 110, a multiple illuminant based color sensor array 120, such as an LED or laser based array, a memory 130, comprising a look-up table memory 135, a sensor voltage normalization device 140, a reflectance value reconstruction device 150, a normalized voltage to reflectance value conversion device 160, and a spectral curve output device 170, all interconnected by link 105.

The link 105 can be any wired or wireless link, or combination thereof, that supplies information between the connected elements. For example, the link 105 can be a network, such as a LAN, a WAN, an intranet or the Internet. Thus, the connected elements may be, for example, collocated at an image processing device, or alternatively, distributed throughout a network or located at a remote spectral curve reconstruction device.

In operation, sensor voltages are received from an LED sensor head, such as that disclosed in copending application Ser. No. 09/535,007, at the direction of the controller/processor 110. While the preferred embodiment will be discussed in relation to an LED based sensor head, it is to be appreciated that any multiple illuminant sensor head will work equally well with the systems and methods of this invention.

Next, the received LED sensor array voltages are normalized by the sensor voltage normalization device 140, using a white tile calibration which is standard practice in the color measurement industry. These normalized voltages are updated based on a statistical model. In particular, a linear affine model is constructed using, for example, off-line or predetermined training samples. This model establishes a correction look-up table that is used for further updating the normalized voltages at mean LED wavelengths. These corrected normalized voltages are referred to as measured reflectance values at a mean LED wavelengths. In particular, training samples are predetermined depending on the gamut volume. For example, if colors from a plurality of products are to be measured, then the training samples should cover a volume larger than the outputs of all of the products together. Therefore, the number of training samples depends on the type of the model. In the prototype that was built, for training the parameters of the model just over 1000 Pantone™ samples were chosen. However, this number can be adjusted depending on, for example, the environment of the spectral curve reconstruction device and desired accuracy.

The linear affine model is based on a statistical model where:

$$y = M\theta. \tag{1}$$

Matrix M refers to a data matrix containing normalized voltages for the training samples. θ refers to a parameter matrix. Matrix y refers to the corresponding true reflectance values for the training samples measured with a reference spectrophotometer, such as the Gretag device. For the linear affine model, the M matrix is written as follows for N samples with $v_1, v_2, \ldots v_i$ as the normalized voltages for each sample, where i corresponds to the number of illuminant devices, which are here illustrated as 10 normalized voltages based on the number of LEDs in the Ser. No. 09/535,007 Application:

$$M = \begin{bmatrix} 1 & v_1^1 & v_2^1 & \cdots & v_{10}^1 \\ 1 & v_1^2 & v_2^2 & \cdots & v_{10}^2 \\ \vdots & \vdots & \vdots & \vdots & \vdots \\ 1 & v_1^N & v_2^N & \cdots & v_{10}^N \end{bmatrix} \quad (2)$$

The parameter matrix, θ, is obtained using a one time batch least squares technique. The parameter matrix is given by the standard equation:

$$\theta = [M^T M]^{-1} M^T y. \quad (3)$$

This quadratic affine model was used for the results shown in FIGS. 1–4. The M matrix contains more elements than that shown in Eq. 2 to represent the quadratic affine model. Thus, the parameter matrix only need be determined one time, for example, during product production or during a subsequent calibration routine and stored in the look-up table memory 135. The parameter matrix should not have to change for the entire life of the product, since the white tile calibration performed during the sensor voltage normalization step reduces the variability of the sensor output due to variability inside the sensor and the drive circuits.

Now that the equations used for the correction look-up table, i.e., Eq. 1 above with parameter and data matrices is clear, conversion of the normalized voltages to measured reflectance values at mean LED wavelengths is straightforward.

In particular, the normalized voltage to reflectance value conversion device 160, at the direction of the controller/processor 110 and with the aid of the memory 130, rearranges the normalized sensor values in matrix form as illustrated by the matrix M.

Next, the reflectance value conversion device 160, at the direction of the controller/processor 110 and with the aid of the memory 130, multiplies the data matrix M by the parameter matrix θ, which is stored in the memory 130. This yields the updated normalized voltages, i.e., the measured reflectance, at the mean LED wavelengths. However, it is to be appreciated that wavelengths other than mean LED wavelengths are applicable.

Using the measured reflectance values at the direction of controller 110, and with the aid of the reconstruction look-up table stored in the look-up table memory 135, a final reflectance curve is obtained and this curve output to the spectral curve output device 170.

The reflectance value reconstruction device 150 determines a reconstruction look-up table using previously acquired samples which will also be stored in the look-up table memory 135.

Determining the reconstruction look-up table is as follows: First, the to be constructed reconstruction look-up table is defined as a matrix $P^+$. "r" is defined the vector containing 10 true reflectance values and vector, and R is the fully populated 36 reflectance values for a known sample. However, it is to be appreciated that different combinations of the number of sensed voltages and interpolated reflectance values can be used depending on the desired accuracy of the system. In particular, the accuracy of the interpolated/extrapolated full spectra reflectance curve determined in accordance with the system and method of this invention is proportional to the number of determined sensor voltages.

The vector $\hat{R}$ is the reconstructed reflectance curve with 36 values. Using these variables, the following two equations are defined:

$$\hat{R} = P^+ r \quad (4)$$

$$r = P^T R \quad (5)$$

where T represents the transpose of the matrix, P. The matrix P contains columns of vector of zeros with a single unit value in slots corresponding to the mean LED wavelengths. Also, a spectral matrix "Ω" with all the true reflectance spectra of the color space, for example, the Pantone™ spectra is defined as:

$$\Omega = [R_1, R_2, \ldots R_N] \quad (6)$$

where, $R_1$, $R_2$, $R_3$, . . . , $R_N$ are the reflectance curves, containing, for example, 36 elements in each, as measured by a reference spectrophotometer. Substituting Eq. 5 into Eq. 4 and using the form of the spectral matrix shown by Eq. 6, an equivalent estimated spectral matrix is determined as follows:

$$\hat{\Omega} = P^+ P^T [R_1 R_2 \ldots R_N] = P^+ P^T \Omega \quad (7)$$

By minimizing the Frobenius norm of $\hat{\Omega} = P^+ P^T \Omega$, the following represents the equation for determining the reconstruction look-up table:

$$P^+ = \Sigma P [P^T \Sigma P]^{-1}. \quad (8)$$

$\Sigma = [\Omega \Omega^T]/N$ is the covariance matrix of the N Pantone™ spectra and the reconstruction look-up table is the matrix P+. The matrix P+, in this exemplary embodiment, is a 36×10-element matrix, however, as previously discussed, other size matrices are possible depending on the accuracy required and the number of illuminant measurements from the sensor. The method described above uses the least squares optimal reconstruction approach. After determination, the reconstruction look-up table is constructed and is stored in the look-up table memory 130.

With the reconstruction look-up table the limited number of reflectance values are converted to a greater number of reflectance values having a predetermined wavelength separation. In particular, the reflectance value reconstruction device multiplies the reflectance values, e.g., 10 values, by the $P^+$ matrix. The output gives the spectra which is output by the spectral curve output device and can be used for quality control, color management, printer characterization, color balancing, or the like.

Figure 10:
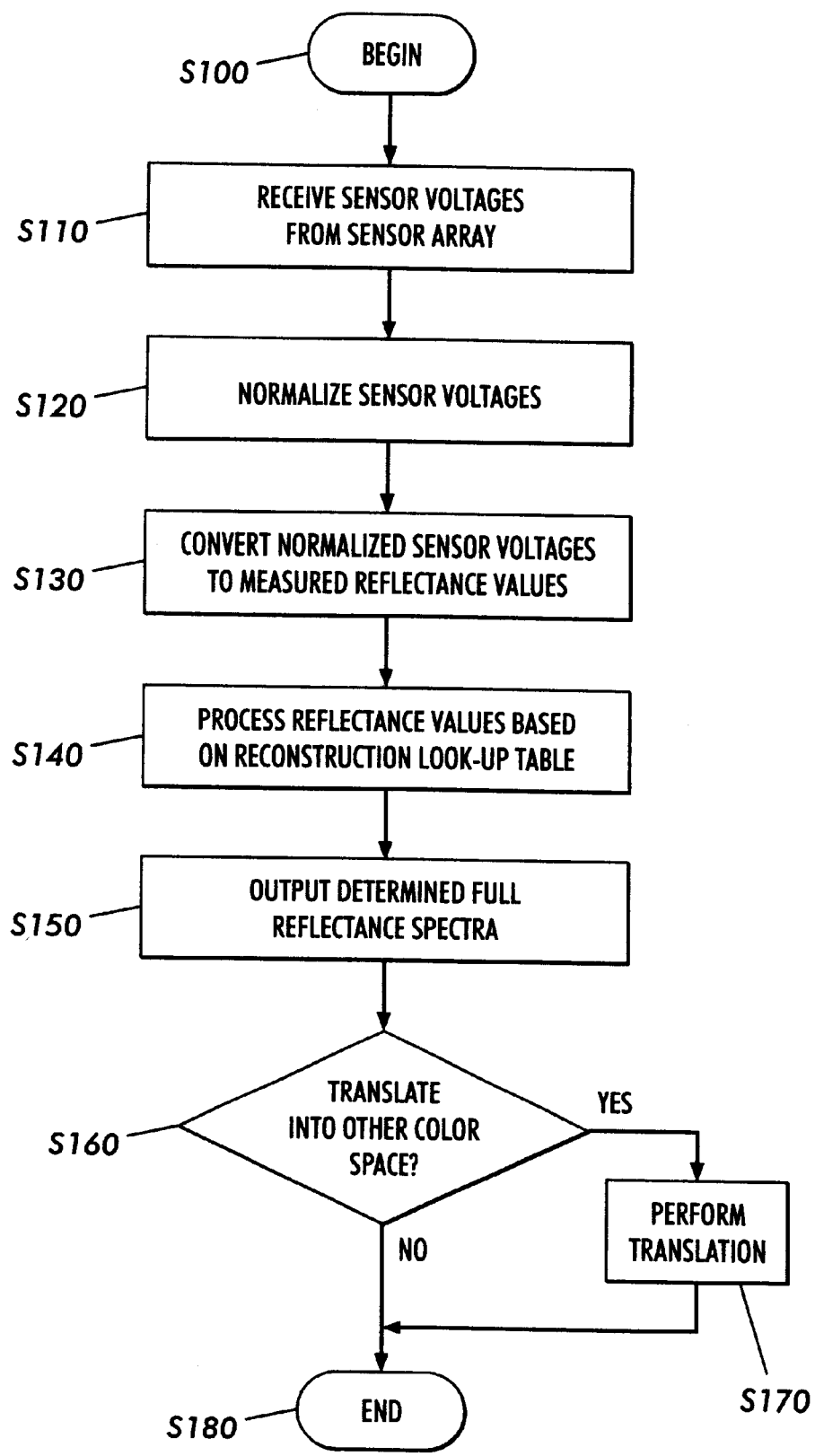
FIG. 10 is a flowchart outlining one exemplary embodiment of a method for determining a spectral curve according to this invention.

FIG. 10 illustrates the operation of the spectral curve reconstruction device according to this invention. Specifically, control begins in step S100 and continues to step S110. In step S110, sensor voltages are received from an LED sensor array. Next, in step S120, the sensor voltages received from the LED sensor array are normalized using the white tile calibration data. Then, in step S130, the normalized sensor voltages are further modified, e.g., corrected, to measured reflectance values at mean LED wavelengths. Control then continues to step S140.

In step S140, the measured reflectance values are processed using the reconstruction look-up table at predetermined wavelength separation. Then, in step S150, the full spectral reflectance curve is output. Control then continues to step S160.

In step S160, a determination is made whether to translate the reflectance curve into another color space. If translation to a color space is desired, control continues to step S170.

Otherwise, control jumps to step S180 where the control sequence ends.

In step S170, translation to another color space as is well known in the art is performed. Control then continues to step S180 where the control sequence ends.

As shown in FIG. 9, the spectral curve reconstruction device is preferably implemented either on a single program general purpose computer or separate programmed general purpose computer, with an associated multiple illuminant sensor array and spectral curve output devices. However, the spectral curve reconstruction device can also be implemented on a special purpose computer, a programmed micro-processor or micro-controller and peripheral integrated circuit element, an ASIC or Another integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowchart shown in FIG. 10 can be used to implement the spectral curve reconstruction device according to this invention.

Furthermore, the disclosed method may be readily implemented in software using object or object-oriented software development environments that provide portable source code that can be used on a variety of computer or workstation hardware platforms. Alternatively, the disclosed spectral curve reconstruction device may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The image processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed method may be readily implemented as software executed on a programmed general purpose computer, a special purpose computer, a microprocessor, or the like. In this case, the method and system of this invention can be implemented as a routine embedded on a personal computer or as a resource residing on a server or workstation, such as a routine embedded in a photocopier, a color photocopier, a printer driver, a scanner, or the like. The spectral curve reconstruction device can also be implemented by physically incorporating the system and method into a software and/or hardware system, such as the hardware and software system of a photocopier or a dedicated image processing system.

It is, therefore, apparent that there has been provided in accordance with the present invention, a system and method for determining a spectral curve. While this invention has been described in conjunction with preferred embodiments thereof, it is evident that many alternatives, modifications and variations be apparent to those skilled in the art. Accordingly, Applicant intends to embrace all such alternatives, modifications and variations that follow in the spirit and scope of this invention.

What is claimed is:

1. A spectral curve reconstruction system comprising:
a reflectance value conversion device that converts a plurality of normalized, sensor voltage measurements to reflectance values; and
a spectral curve output device that determines a spectral reflectance curve based on the normalized, sensor voltage measurements and a plurality of reconstruction values.

2. The system of claim 1, wherein the reflectance values are at a mean wavelength.

3. The system of claim 1, wherein normalization of the sensor voltage measurements is based on a calibration technique.

4. The system of claim 3, wherein the calibration technique is based on a parameterized model where:

$$y = M\theta,$$

where matrix M refers to a data matrix containing normalized voltages for a plurality of samples, $\theta$ is a parameter matrix, and matrix y is the corresponding measured reflectance values for the samples.

5. The system of claim 4, wherein the matrix M, having N samples with $v_1, v_2, \ldots v_i$ being the normalized voltages for each sample, is:

$$M = \begin{bmatrix} 1 & v_1^1 & v_2^1 & \cdots & v_i^1 \\ 1 & v_1^2 & v_2^2 & \cdots & v_i^2 \\ \vdots & \vdots & \vdots & \vdots & \vdots \\ 1 & v_1^N & v_2^N & \cdots & v_i^N \end{bmatrix}.$$

6. The system of claim 4, wherein the parameterized model is determined at least one of during production and during a calibration.

7. The system of claim 4, wherein the parameter matrix $\theta$ is defined as:

$$\theta = [M^T M]^{-1} M^T Y.$$

8. The system of claim 1, further comprising a reflectance value reconstruction device that determines a reconstruction look-up table based on a plurality of reference measurements.

9. The system of claim 8, wherein the reconstruction look-up table is a matrix $P^+$ where:

$$P^+ = \Sigma P [P^T \Sigma P]^{-1},$$

where $\Sigma = [\Omega \Omega^T]/N$ which a covariance matrix of an N color space spectra.

10. The system of claim 9, wherein an equivalent estimated spectral matrix is defined as:

$$\hat{\Omega} = P^+ P^T [R_1 R_2 \ldots R_N] = P^+ P^T \Omega,$$

wherein a spectral matrix $\Omega$ with the measured reflectance spectra of the color space is defined as:

$$\Omega = [R_1, R_2, \ldots R_N],$$

where, $R_1, R_2, R_3, \ldots, R_N$ are a plurality of reflectance curves.

11. The system of claim 1, wherein, in determining the spectral reflectance curve, the spectral curve output device converts the reflectance values to reflectance values with a predetermined wavelength separation, the total number of reflectance values with the predetermined wavelength separation being greater than the total number of normalized sensor voltage measurements.

12. The system of claim 11, wherein the number of normalized sensor voltage measurements is 16 or less, and the number of reflectance values with the predetermined wavelength separation is about 36.

13. An image processing system incorporating the spectral curve reconstruction system of claim 1.

14. A method of determining a spectral curve comprising:
receiving a plurality of sensor voltage measurements from a multiple illuminant color sensor;
normalizing the received sensor voltage measurements;
converting the normalized sensor voltages to a plurality of reflectance values;
converting the reflectance values to reflectance values with a predetermined wavelength separation; and
outputting the spectral curve.

15. The method of claim 14, wherein the reflectance values are at a mean wavelength.

16. The method of claim 14, wherein normalization of the sensor voltage measurements is based on a calibration technique.

17. The method of claim 16, wherein the calibration technique is based on parameterized model where:

$$y = M\theta,$$

where matrix M refers to a data matrix containing normalized voltages for a plurality of samples, $\theta$ is a parameter matrix, and matrix y is the corresponding measured reflectance values for the samples.

18. The method of claim 17, wherein the matrix M, having N samples with $v_1, v_2, \ldots v_i$ being the normalized voltages for each sample, is:

$$M = \begin{bmatrix} 1 & v_1^1 & v_2^1 & \cdots & v_i^1 \\ 1 & v_1^2 & v_2^2 & \cdots & v_i^2 \\ \vdots & \vdots & \vdots & \vdots & \vdots \\ 1 & v_1^N & v_2^N & \cdots & v_i^N \end{bmatrix}.$$

19. The method of claim 17, wherein the parameterized model is determined at least one of during production and during a calibration.

20. The method of claim 17, wherein the parameter matrix $\theta$ is defined as:

$$\theta = [M^T M]^{-1} M^T y.$$

21. The method of claim 14, wherein the reflectance value reconstruction device determines a reconstruction look-up table based on a plurality of reference measurements.

22. The method of claim 21, wherein the reconstruction look-up table is a matrix $P^+$ where:

$$P^+ = \Sigma P [P^T \Sigma P]^{-1},$$

where $\Sigma = [\Omega \Omega^T]/N$ which a covariance matrix of an N color space spectra.

23. The method of claim 22, wherein an equivalent estimated spectral matrix is defined as:

$$\hat{\Omega} = P^+ P^T [R_1 \ R_2 \ldots R_N] = P^+ P^T \Omega,$$

wherein a spectral matrix $\Omega$ with the measured reflectance spectra of the color space is defined as:

$$\Omega = [R_1, R_2, \ldots R_N],$$

where, $R_1, R_2, R_3, \ldots, R_N$ are a plurality of reflectance curves.

24. The method of claim 14, wherein the total number of reflectance values with the predetermined wavelength separation is greater than the total number of normalized sensor voltage measurements.

25. The method of claim 24, wherein the number of normalized sensor voltage measurements is 16 or less, and the number of reflectance values with the predetermined wavelength separation is about 36.

* * * * *